(12) United States Patent
Torgersen

(10) Patent No.: US 12,296,993 B2
(45) Date of Patent: May 13, 2025

(54) DRONE WITH RAILWAY DRIVING CAPABILITIES

(71) Applicant: Railway Robotics AS, Ås (NO)

(72) Inventor: Jørgen Torgersen, Ås (NO)

(73) Assignee: Railway Robotics AS, Ås (NO)

(*) Notice: Subject to any disclaimer, the term of this patent is extended or adjusted under 35 U.S.C. 154(b) by 0 days.

(21) Appl. No.: 18/272,900

(22) PCT Filed: Dec. 10, 2021

(86) PCT No.: PCT/NO2021/050259
§ 371 (c)(1),
(2) Date: Jul. 18, 2023

(87) PCT Pub. No.: WO2022/169368
PCT Pub. Date: Aug. 11, 2022

(65) Prior Publication Data
US 2024/0076065 A1 Mar. 7, 2024

(30) Foreign Application Priority Data

Feb. 3, 2021 (NO) .................................. 20210132

(51) Int. Cl.
B64U 10/70 (2023.01)
B60F 5/02 (2006.01)
(Continued)

(52) U.S. Cl.
CPC ............... B64U 10/70 (2023.01); B60F 5/02 (2013.01); B61D 15/12 (2013.01); B61F 13/00 (2013.01);
(Continued)

(58) Field of Classification Search
CPC ........ B64C 37/02; B64U 10/70; B64U 60/70; B64U 30/26; B64U 30/299; B64U 50/14; B64F 5/02; A63H 27/12
See application file for complete search history.

(56) References Cited

U.S. PATENT DOCUMENTS 8,167,234 B1 * 5/2012 Moore .................... B64C 37/00
244/17.23
9,108,479 B1 8/2015 Calvert
(Continued)

FOREIGN PATENT DOCUMENTS

CN 204172626 2/2015
CN 104669964 6/2015
(Continued)

OTHER PUBLICATIONS

International Search Report and the Written Opinion for PCT/NO2021/050259, dated Feb. 22, 2022.
(Continued)

Primary Examiner — Michael H Wang
Assistant Examiner — Colin Zohoori
(74) Attorney, Agent, or Firm — Andrus Intellectual Property Law, LLP

(57) ABSTRACT

A drone with railway driving capabilities has a drone body and at propeller arms. Each propeller arm has a propeller assembly having a propeller driven by a motor assembly. The propeller assembly of at least one propeller arm has a rotatably mounted propeller guard placed coaxially with the propeller. The propeller guard is shaped as a train wheel and is driven by the motor assembly. The propeller arm has an actuated joint for providing the propeller assembly with at least one rotation degree of freedom so that the propeller can be rotated between a flight mode and a driving mode and back. The flight mode involves a more horizontal orientation of the propeller assembly for providing an upwardly directed thrust force to the drone, in operational use, and the driving mode involves a more vertical orientation of the propeller assembly for allowing the respective propeller guard to drive on the railway track.

19 Claims, 11 Drawing Sheets

(51) Int. Cl.
*B61D 15/12* (2006.01)
*B61F 13/00* (2006.01)
*B61K 3/00* (2006.01)
*B64C 37/00* (2006.01)
*B64U 10/14* (2023.01)
*B64U 30/299* (2023.01)
*B64U 50/13* (2023.01)
*B64U 50/19* (2023.01)
*B64U 50/30* (2023.01)
*B64U 101/26* (2023.01)
*B64U 101/30* (2023.01)

(52) U.S. Cl.
CPC ............... *B61K 3/00* (2013.01); *B64C 37/00* (2013.01); *B64U 10/14* (2023.01); *B64U 30/299* (2023.01); *B64U 50/13* (2023.01); *B64U 50/19* (2023.01); *B64U 50/30* (2023.01); *B64U 2101/26* (2023.01); *B64U 2101/30* (2023.01); *B64U 2201/20* (2023.01)

(56) References Cited

U.S. PATENT DOCUMENTS

| | | | | |
|---|---|---|---|---|
| 11,338,634 | B1* | 5/2022 | Lacaze | B60F 5/02 |
| 11,702,194 | B1* | 7/2023 | Kempshall | B64U 10/14 |
| | | | | 416/189 |
| 11,760,477 | B2* | 9/2023 | Rallings | B64C 25/36 |
| | | | | 244/2 |
| 2017/0029103 | A1 | 2/2017 | Chang et al. | |
| 2018/0257447 | A1 | 9/2018 | Nam et al. | |
| 2019/0144007 | A1 | 5/2019 | Lum et al. | |
| 2021/0387739 | A1* | 12/2021 | Neff | B64U 10/70 |
| 2022/0170212 | A1 | 6/2022 | Torgersen | |
| 2023/0150660 | A1* | 5/2023 | Ramezani | B64U 10/14 |
| | | | | 244/2 |

FOREIGN PATENT DOCUMENTS

| | | |
|---|---|---|
| CN | 109249768 | 1/2019 |
| CN | 112026463 | 12/2020 |
| ES | 2691145 | 11/2018 |
| KR | 101794198 | 11/2017 |
| KR | 20200012524 | 2/2020 |
| WO | 2019093967 | 5/2019 |
| WO | 2020209726 | 10/2020 |

OTHER PUBLICATIONS

Norwegian Search Report issued in Corresponding Norwegian Application No. 20210132, dated Aug. 27, 2021.
Extended European Search Report dated Nov. 14, 2024 in European Application No. 21925008.1.
Flyvende beredskap, retrieved from: https://www.banenor.no/Nyheter/Nyhetsarkiv/Arkiv/2018/flyvende-beredskap/ on Oct. 1, 2021.
Selvkjørende robotdrone smører sporveksler (Bane NOR) 2018, retrieved from: https://www.banenor.no/Nyheter/Nyhetsarkiv/Arkiv/2018/selvkjorende-robotdrone-smorer-sporveksler/ on Oct. 1, 2021.

* cited by examiner

DRONE WITH RAILWAY DRIVING CAPABILITIES

CROSS-REFERENCE TO RELATED APPLICATIONS

This application is the U.S. national stage application of International Application PCT/NO2021/050259, filed Dec. 10, 2021, which international application was published on Aug. 11, 2022, as International Publication WO 2022/169368 in the English language. The International Application claims priority of Norwegian Patent Application No. 20210132, filed Feb. 3, 2021. The international application and Norwegian application are both incorporated herein by reference, in entirety.

FIELD OF THE INVENTION

The invention relates to an improved drone with railway driving capabilities.

BACKGROUND OF THE INVENTION

A drone with railway driving capability was reported before. WO2020/209726A1, concerning an invention from the same inventor, discloses a drone for lubricating a railway switch, the drone being remotely controllable and configured for moving on a railway track, wherein the drone comprises a container for lubricant and at least one nozzle configured for lubricating the railway switch with the lubricant. The document further discloses a system comprising the drone and a controller for remotely controlling said drone. Furthermore, it discloses a method for lubricating a railway switch, wherein the method comprises the steps of: i) remotely directing the device to the railway switch; ii) remotely instructing the device to lubricate the railway switch; and iii) remotely directing the device away from the railway switch to avoid hindering train traffic passing said switch.

The known drone constitutes a clear improvement over the existing solutions for lubricating railway switches, a new application area where drones can be used. However, there is a need to further develop and improve the functionality of drones.

SUMMARY OF THE INVENTION

The invention has for its object to remedy or to reduce at least one of the drawbacks of the prior art, or at least provide a useful alternative to prior art.

The object is achieved through features which are specified in the description below and in the claims that follow.

The invention is defined by the independent patent claims. The dependent claims define advantageous embodiments of the invention.

In a first aspect the invention relates to a drone having railway driving capabilities, the drone comprising:
a drone body, and
at least three propeller arms distributed around and connected to the drone body, wherein each propeller arm is provided with a propeller assembly comprising a propeller, wherein each propeller is driven by a motor assembly. The drone is characterised in that the propeller assembly of at least a subset of the at least three propeller arms is provided with a rotatably mounted propeller guard mounted around and being placed coaxially with the propeller, wherein the propeller guard is shaped as a train wheel and is driven by the motor assembly. The drone is further characterised in that the subset of the at least three propeller arms is provided with an actuated joint for providing the thereto connected propeller assembly with at least one rotation degree of freedom (DOF) so that the propeller can be rotated between a flight mode and a driving mode and back. The flight mode involves a more horizontal orientation of the propeller assembly for providing an upwardly directed thrust force to the drone, in operational use. Furthermore, the driving mode involves a more vertical orientation of the propeller assembly for allowing the respective propeller guard to drive on the railway track.

The effects of the features of the drone in accordance with the invention are explained below.

First of all, it must be noted that drone propellers are dangerous to people and damaging to equipment in case the drone collides. Propeller guards are conventionally used to reduce the risk of injury to people or damage to equipment. In prior art solutions they only add weight, drag and complexity to drones. A first key feature of the invention is that the propeller guards form a vital part of the drive train, because they serve both as propeller guard for the propellers as well as train wheels. The propeller guards are rotatably mounted and coaxially with the propellers. These features result in a highly effective use of the space and reduce the weight and complexity of the drone. The rotatable propeller guards only need to have a slightly larger diameter than the propellers. Their large size allows for compliance with train wheel standards and ensures smooth running through the unguided part of a fixed crossing. Reusing the propeller guards as wheels opens a totally new design space for drones as the embodiments in the current specification also will illustrate.

It is important to note that the respective propeller arms are provided with at least one rotation degree of freedom through a respective actuated joint (a standard off-the-shelf robot feature), so that the respective propeller assemblies can be switched between a flying mode and a driving mode as claim 1 describes. This will allow the propeller assemblies to be positioned vertically, horizontally and having any orientation in between. This also makes landing of the drone on the rail easier. In some embodiments the actuated joint may be placed at the ends of the propeller arms near the motor assembly for the propeller and the propeller guard, but this is not essential.

The actuated joints also provide the drone with better aerial skills and flight capability in case one motor is broken. If that happens the remaining propellers can be tilted to compensate for the lack of thrust power of the non-functioning propeller. A further effect is that the centre of gravity and moment of inertia is better than the known drones because more weight is placed in the vicinity of the propeller by the coaxially placed propeller guards. This design is also cost-effective in view of mass-production since the actuated coaxial propeller/wheel drivetrain may be produced as one part.

To facilitate understanding of the invention one or more expressions are further defined hereinafter.

The wording "flight mode" must be interpreted as a mode of the drone wherein at least a subset of the propellers is oriented and positioned for generating at least upward thrust, which means that the respective propeller and propeller guards are oriented in a non-vertical plane, because a fully vertical plane would result in no upward thrust force at all.

The wording "driving mode" must be interpreted as a mode of the drone wherein at least a subset of the propellers is oriented and positioned for allowing the drone to drive on their respective propeller guards, which means that the respective propeller and propeller guards are oriented in a non-horizontal plane, because a fully horizontal plane would make it impossible for the propeller guards to drive on a horizontal railway track.

In an embodiment of the drone according to the invention the actuated joints are placed near ends of the propeller arms. The advantage of this embodiment is that rotation of the propeller assembly will not result in a significant translation of the propeller assembly. In a variant of this embodiment the actuated joints are placed further away from the end or in middle sections of the propeller arms. These embodiments will still work. However, a rotation of the propeller assembly will then inevitably result in significant translation of the propeller assembly during the rotation. This translation must then to be accounted for when designing and dimensioning the propeller arms of the drone, so that it will fit on a railway track when in driving mode.

In an embodiment of the drone according to the invention the subset comprises at least two propeller arms, and preferably at least three propeller arms. The drone will need at least two wheels to be able to properly drive on the railway track, and preferably more to be able to drive in a stable manner without requiring balancing techniques. The wording "subset" refers to a selection of the total number of propeller arms that is provided with an actuated joint causing the connected propeller assembly to be pivotable.

In an embodiment of the drone according to the invention at least one of the actuated joints is configured for providing at least two rotation degrees of freedom. This embodiment is advantageous because it makes it easier to independently configure the flight mode and the driving mode based upon a given propeller arm configuration. Expressed differently, it will be easier to manipulate the propeller assemblies into the right positions and orientations when switching to either flight mode or driving mode. In fact, this embodiment opens the possibility for very smooth landing in case there are four propeller assemblies that are all rotatable in accordance with the invention. This will be explained further in the detailed description. In this embodiment the actuated joint may comprise a single subjoint providing two rotation degrees of freedom or a double subjoint, wherein each subjoint provides one rotation degree of freedom. Such subjoint would typically be a ball joint with sophisticated actuators to allow for two rotation degrees of freedom. However, the use of two subjoints each providing only one rotation degree of freedom has certain technical advantages.

These aspects will be elaborated upon further in the detailed description.

In an embodiment of the drone according to the invention at least one of the actuated joints is configured for providing at least three rotation degrees of freedom. Using three rotation degrees of freedom provides even more flexibility to the drone in terms of adaptability to different requirements, i.e., railway track width in driving mode or maximum drone diameter in flight mode. Also, in this embodiment the actuated joint may comprise a single subjoint providing three rotation degrees of freedom, a double subjoint wherein one provides one rotation degree of freedom and the other subjoint two rotation degrees of freedom, or a triple subjoint, wherein each subjoint provides one rotation degree of freedom. These aspects will be elaborated upon further in the detailed description.

In an embodiment of the drone according to the invention the drone comprises a total of four propeller arms. This constitutes a first group of embodiments that is discussed in the detailed description. The subset having tiltable propeller assemblies may comprise three or four propeller arms, implying all the arms in the latter embodiment.

In an embodiment of the drone according to the invention the drone comprises a total of six propeller arms. This constitutes a second group of embodiments that is discussed in the detailed description. The subset having tiltable propeller assemblies may comprise three to six propeller arms, implying all the arms in the latter embodiment.

In an embodiment of the drone according to the invention the drone comprises a total of eight propeller arms. This constitutes a third group of embodiments that is discussed in the detailed description. The subset having tiltable propeller assemblies may comprise three to eight propeller arms, implying all the arms in the latter embodiment.

In an embodiment of the drone according to the invention the motor assembly comprises a first motor for driving the propeller and a second motor for driving the propeller guard. As far as driving the propellers and the propeller guards is concerned there are numerous possibilities to implement this. The embodiment presented here is an advantageous embodiment which is very compact, volume efficient and has a very good power-to-weight ratio. This embodiment is discussed in more detail in the detailed description.

In an embodiment of the drone according to the invention the motor assembly comprises a gear and a motor for driving the propeller and the propeller guard, wherein the gear is coupled between the propeller and the propeller guard. This embodiment requires fewer motors but is mechanically a bit more complex. This embodiment is discussed in more detail in the detailed description.

In an embodiment of the drone according to the invention the drone further comprises at least one camera, preferably a plurality of cameras for performing visual inspection. The inspection cameras render the drone very suitable for amongst others railway inspection. The inspection cameras may be mounted to the drone body through camera arms as also presented in the detailed description. More details are also found in earlier-discussed patent publication WO2020/209726A1.

In an embodiment of the drone according to the invention the drone further comprises railway maintenance equipment, such as a lubrication system, a manipulator or gripper. The lubrication system may typically comprise a lubricant container connected to nozzles for spraying the lubricant. The nozzles may be conveniently placed on the propeller arms. More details are also found in earlier-discussed patent publication WO2020/209726A1. Manipulators or grippers may be used to perform operations on the railway track or to pick up or release objects.

In an embodiment of the drone according to the invention at least a selection of the propeller guards is designed as normal wheels for improving driving on other surfaces than railway tracks. This may be one or more of the propeller guards. The drone may also drive on other surfaces without any propeller guards being designed as normal wheels. However, replacing those train wheels with normal wheels will render driving on other surfaces easier, particularly when the normal wheels are provided with rubber tyres, for example.

In an embodiment of the drone according to the invention at least one of the propeller arms provides at least one translation degree of freedom. Adding a translation degree of freedom to the propeller arms allows for even more flexibility of reshaping/morphing the drone when switching between flight mode and driving mode and back. An example of a translation degree of freedom is to make the propeller arms telescopically extendible. It goes without saying that the other two translation degrees of freedom also imply a pivotable movement of the propeller arm requiring a further joint.

In an embodiment of the drone according to the invention at least one of the propeller arms provides at least two translation degrees of freedom. Compared to the previously mentioned embodiment, adding two translation degrees of freedom to the propeller arms allows for even more flexibility of reshaping/morphing the drone when switching between flight mode and driving mode and back.

BRIEF INTRODUCTION OF THE FIGURES

In the following is described examples of embodiments illustrated in the accompanying figures, wherein:

FIG. 15a shows a zoom view of FIG. 15a, and

DETAILED DESCRIPTION OF THE EMBODIMENTS

Figure 1:
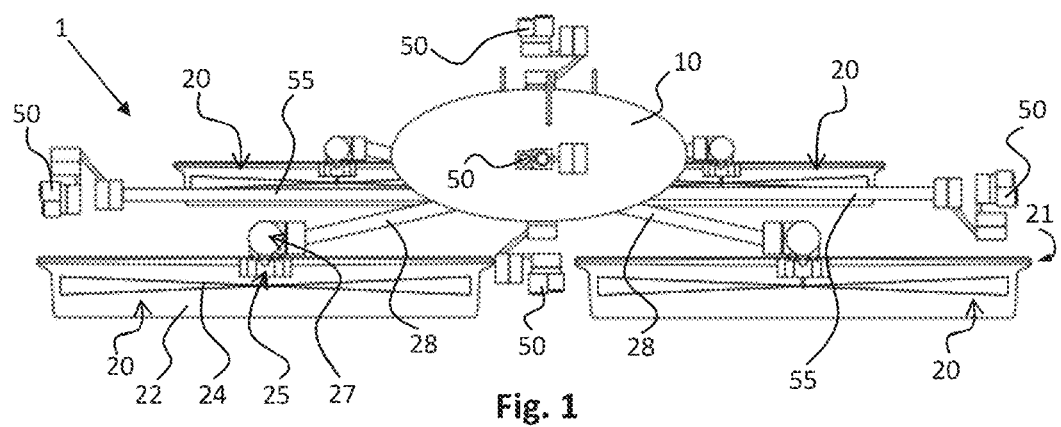
FIG. 1 shows a first embodiment of a drone in accordance with the invention being in flight mode.

Various illustrative embodiments of the present subject matter are described below. In the interest of clarity, not all features of an actual implementation are described in this specification. It will of course be appreciated that in the development of any such embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present subject matter will now be described with reference to the attached figures. Various systems, structures and devices are schematically depicted in the figures for purposes of explanation only and to not obscure the present disclosure with details that are well known to those skilled in the art. Nevertheless, the attached figures are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The invention is a compact coaxial propeller and train wheel motor system, with the propeller inside the train wheel, where the latter also doubles as propeller guard for human/machine and infrastructure/machine safety. The coaxial propeller/wheel drivetrain is actuated by an end effector with at least one degree of freedom. The at least one degree of freedom end effector enables transition from air to rail and from rail to air and flying skills. This system may be used for inspection of railway infrastructure from the air and inspection and (lighter) maintenance of railway infrastructure while running on the rails. An embodiment of the system further compromises six dual thermo and RGB camera gimbal rigs facilitating spherical inspection capabilities and gives the robot excellent understanding of its surroundings allowing for state-of-the-art sense and avoid. The system may also be called a drone or a robot. The system may be provided with necessary compute power from GPU-based robot brain(s) that is also used in self-driving cars. The system is made to be fully autonomous both on rails and in the air.

The invention will be discussed in more detail with reference to the figures. The figures will be mainly discussed in as far as they differ from previous figures.

Figure 2:
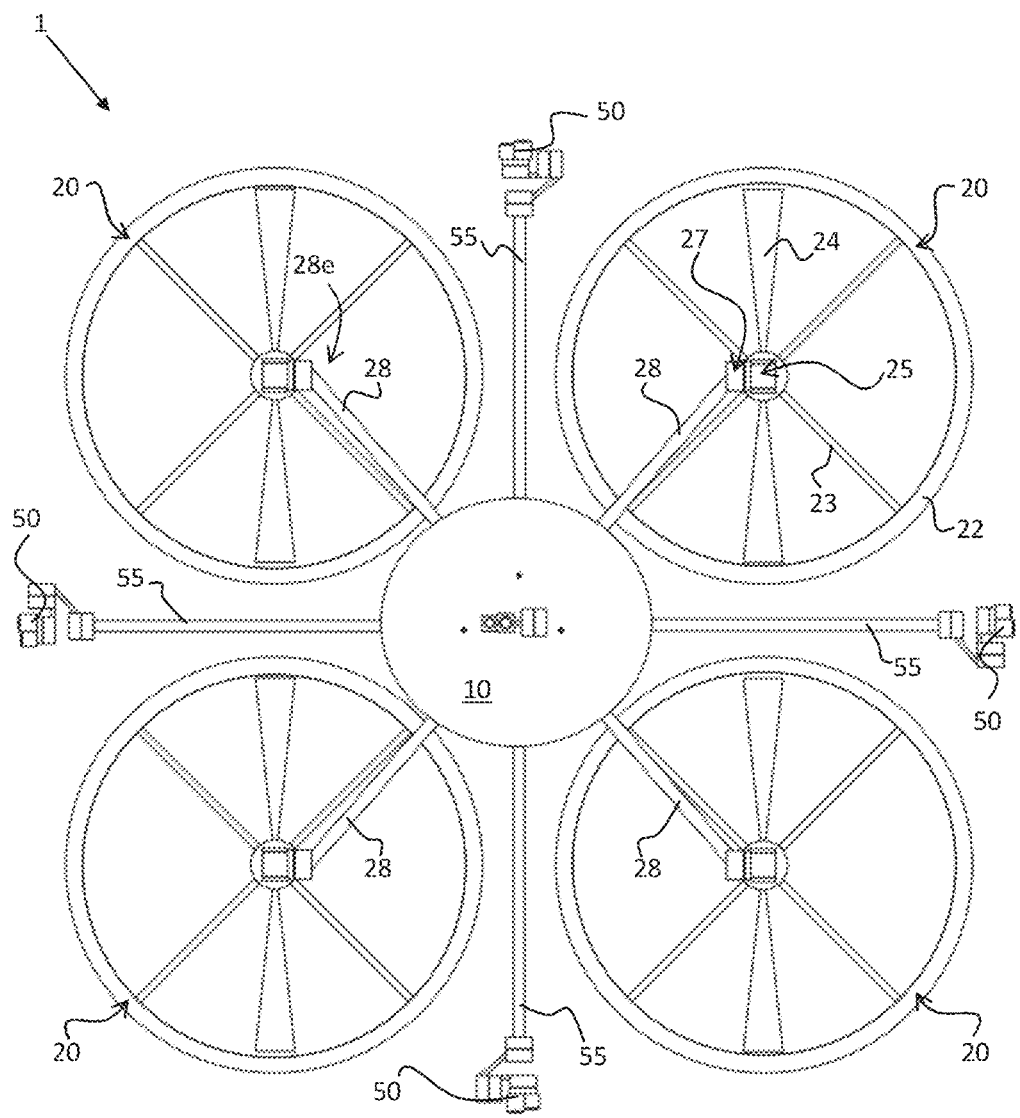
FIG. 2 shows a top view of the drone of FIG. 1.

FIG. 1 shows a first embodiment of a drone 1 in accordance with the invention being in flight mode. FIG. 2 shows a top view of the drone 1 of FIG. 1. The drone 1 comprises a drone body 10 having a plurality of propeller arms 28 extending from the body in radial directions and distributed around the circumference of the drone body 10. At each far end 28e of the propeller arms 28 a respective propeller assembly 20 is mounted via an actuated joint 27. In this embodiment the actuated joint 27 provides two rotation degrees of freedom to the propeller assembly 20. However, the drone may also be built with only one rotation degree of freedom for the propeller assemblies 20, or even with more degrees of freedom including a rotation degree of freedom and up to three translation degrees of freedom. There are in total six degrees of freedom for objects. The actuated joint 27 is coupled to the propeller assembly 20 via a motor assembly 25. The details of the motor assembly 25 will be discussed in more detail in view of FIGS. 6 and 12. The embodiment illustrated in this figure constitutes a so-called quadcopter with four propeller assemblies 25, but the invention may be applied to drones having three or more propeller assemblies 20. The propeller assemblies 20 comprise a propeller 24 and a propeller guard 22, which are rotatably mounted coaxially as illustrated. Further details as regards how the propeller assemblies 20 are assembled are given in view of FIGS. 6, 12 and 14a-15b. The flight mode of the drone 1 in FIGS. 1 and 2 may be recognized by the propeller assemblies 20 being oriented horizontally providing for an upwardly directed thrust in operational use. The propeller guards 22 of the propeller assemblies 20 are shaped as train wheels, which can be observed by the protruding rim 21 at one side of the wheel 22. The propeller guards 22 are coupled to the motor assembly 25 via respective spokes 23 as FIG. 2 clearly illustrates. In this embodiment the drone 1 is further provided with a plurality of cameras 50 that are mounted to the drone body 10 via respective camera arms 55. Furthermore, these cameras comprise six dual thermo and RGB gimbal sensor packs, one for each direction providing spherical inspection possibilities, but it can be any other number of cameras/packs. The cameras will not be further discussed in this description, because the invention is not about changing these cameras compared to the prior art.

Figure 3:
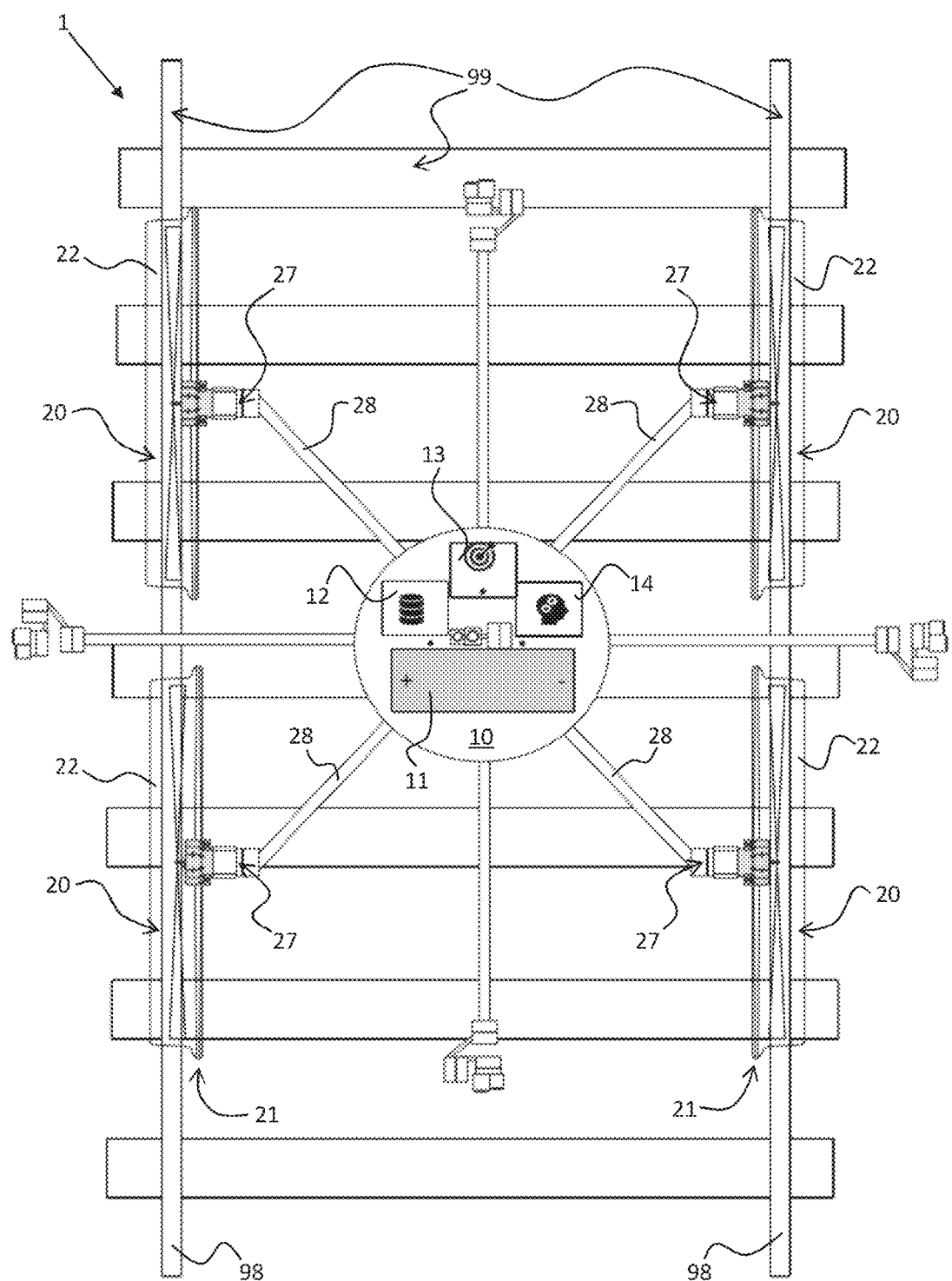
FIG. 3 shows a top view of the drone of FIG. 1 in driving mode, while driving on a railway track.
Figure 4:
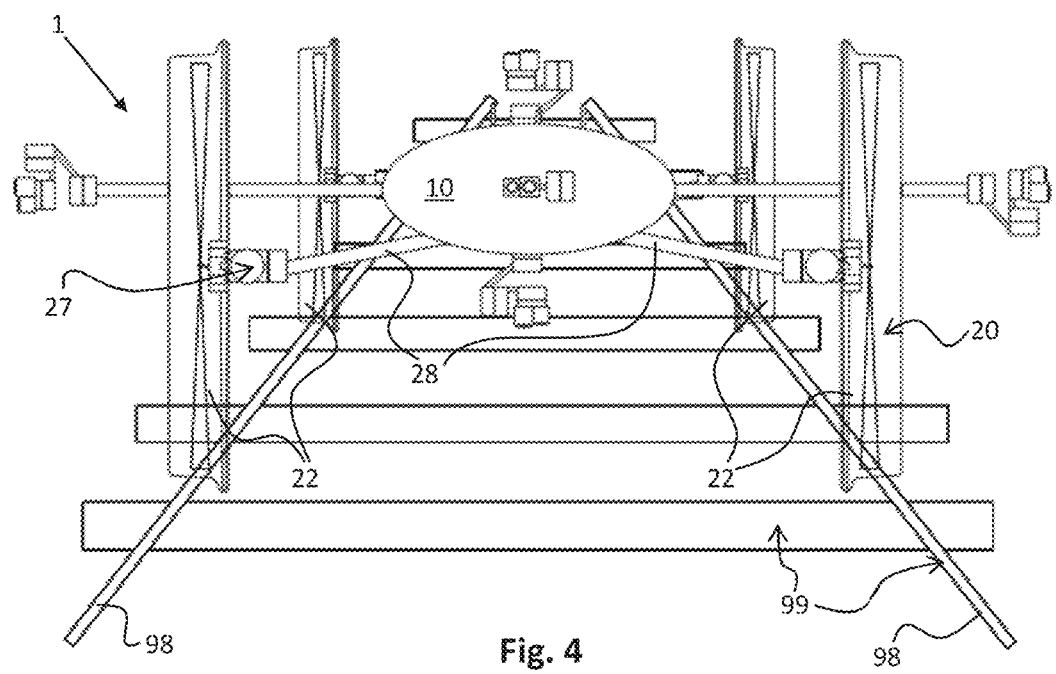
FIG. 4 shows a perspective front view of FIG. 3.
Figure 5:
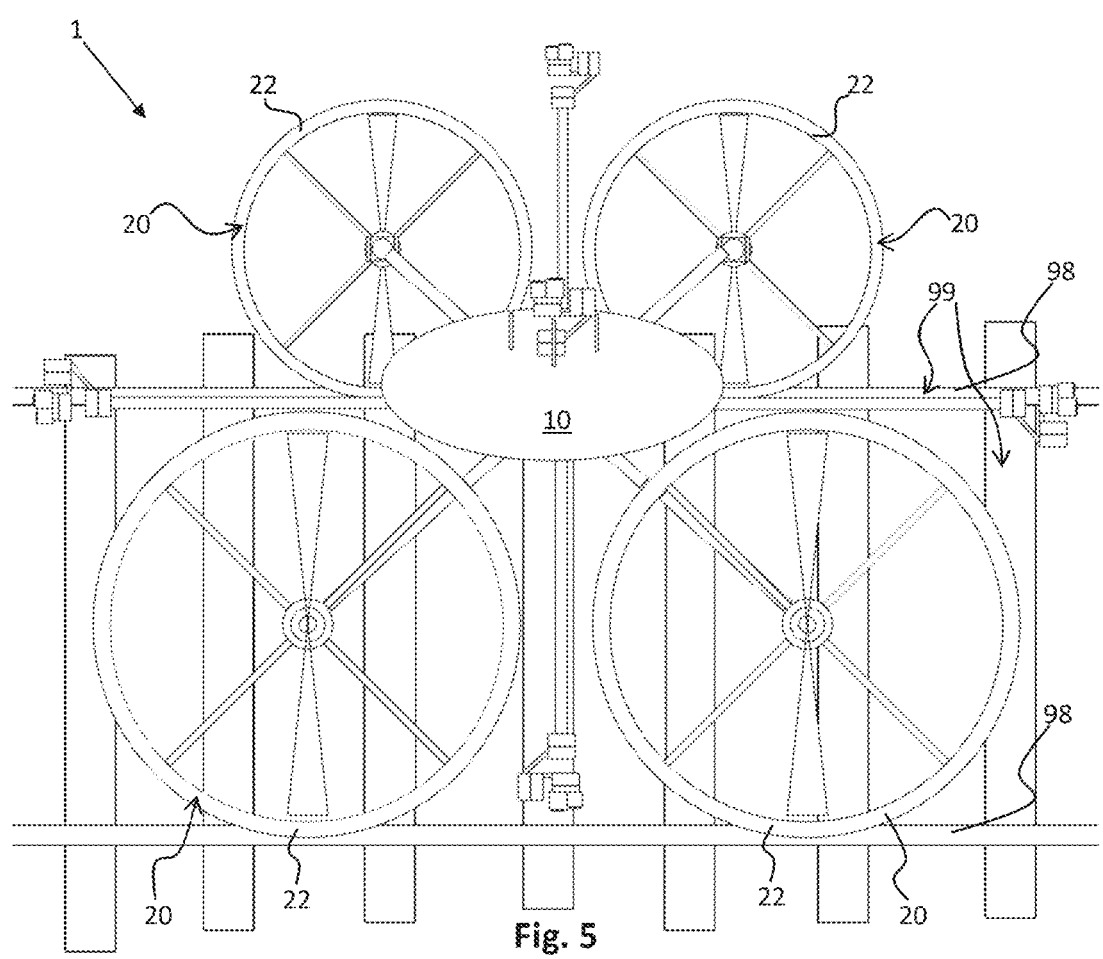
FIG. 5 shows a perspective side view of FIG. 4.

FIG. 3 shows a top view of the drone 1 of FIG. 1 in driving mode, while driving on a railway track 99. FIG. 4 shows a perspective front view of FIG. 3. FIG. 5 shows a perspective side view of FIG. 4. FIG. 3 also schematically shows some further components or modules that are embodied in the drone body 10. These components or modules are only shown in FIGS. 3 and 13 to simplify the figures. A first component that is quite essential for drones is a battery 11 for providing power to the drone 1. A second component is storage or memory 12 for storing all sorts of monitoring data which the drone 1 collects, but also operational data. A third component is a global positioning system (GPS) for tracking a position of the drone 1. A fourth component is a robot brain, general processing unit (GPU) or central processing unit (CPU) or the like. This component is at the heart of the drone and controls all other active components. FIG. 3 also illustrates how the propeller assemblies 20 are vertically oriented and nicely place the propeller guards 22 on the rails 98 of the railway 99 so that the aforementioned protruding rim 21 falls within the rails 98. The flight mode of the drone 1 in FIGS. 3-5 may be recognized by the propeller assemblies being oriented vertically for allowing the drone 1 to drive on the rotatable and driven propeller guards 22. It must be noted that a perfectly vertical orientation is not necessary for allowing the drone 1 to drive on the railway 99. The propeller assemblies 20 may also be oriented in a plane that is tilted relative to a vertical plane.

Figure 6:
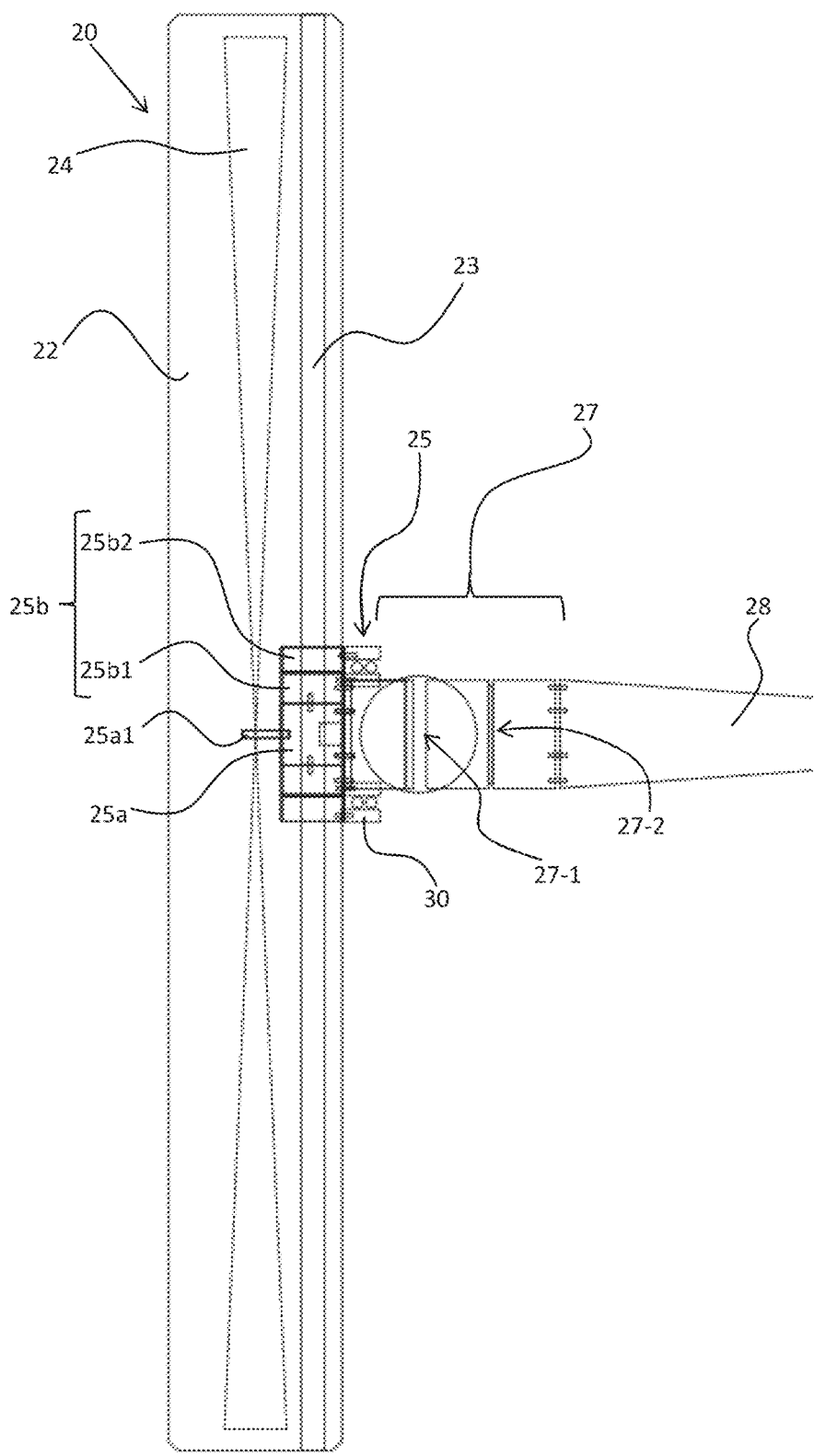
FIG. 6 shows a propeller assembly combined with a 2-DOF actuated joint in accordance with an embodiment of the invention.

FIG. 6 shows a propeller assembly 20 combined with a 2-DOF actuated joint 27 in accordance with an embodiment of the invention. It must be noted that there are many ways of building coaxially placed rotatable driven parts. The embodiment here is a convenient and compact example. The same applies to making actuated joints, where there are many design options. The propeller assembly 20 and actuated joint 27 of FIG. 6 are built up as follows. The motor assembly 25 comprises a first motor 25a and a second motor 25b that is placed concentrically around the first motor 25a. The first motor 25a is the inner motor and is connected to the propeller 28 via the respective actuated joint 27. The first motor 25a has a driving shaft 25a1 that is physically connected with and drives the propeller 24, as illustrated. The second motor 25b is built around the first motor 25a by providing an annular stator 25b1 around the housing of the first motor 25a and then providing a rotor 25b2 around the stator 25b1 as illustrated. Such motors are off-the-shelf products. It is the rotor 25b2 of the second motor 25b that is physically connected with and drives the spokes 23 of the propeller guard 22. Bearings 30 are provided and connect the rotor 25b2 with the propeller arm 28 as illustrated. This configuration enables the first motor 25a to drive the propeller 24 in flight mode. Then the second motor 25b may be typically switched off keeping the propeller guard 22 still, but this is not essential. The propeller guard 22 might also be rotated in the same direction as the propeller 24 or in the opposite direction. Furthermore, the configuration allows the second motor 25b to drive the propeller guard 22 in driving mode. Then the first motor may be switched off keeping the propeller standing still, but this is not essential either. The propeller 24 might also be rotated in the same direction as the propeller guard 22 or in the opposite direction.

FIG. 6 also illustrates how the actuated joint 27 comprises two subjoints 27-1, 27-2, each subjoint taking care of another rotation degree of freedom (DOF). Alternatively, a more complex 2-DOF joint 27 could have been implemented. For the invention to work at least one DOF is required so that the propeller assemblies 20 can be switched from horizontal to vertical orientation or opposite.

Figure 7:
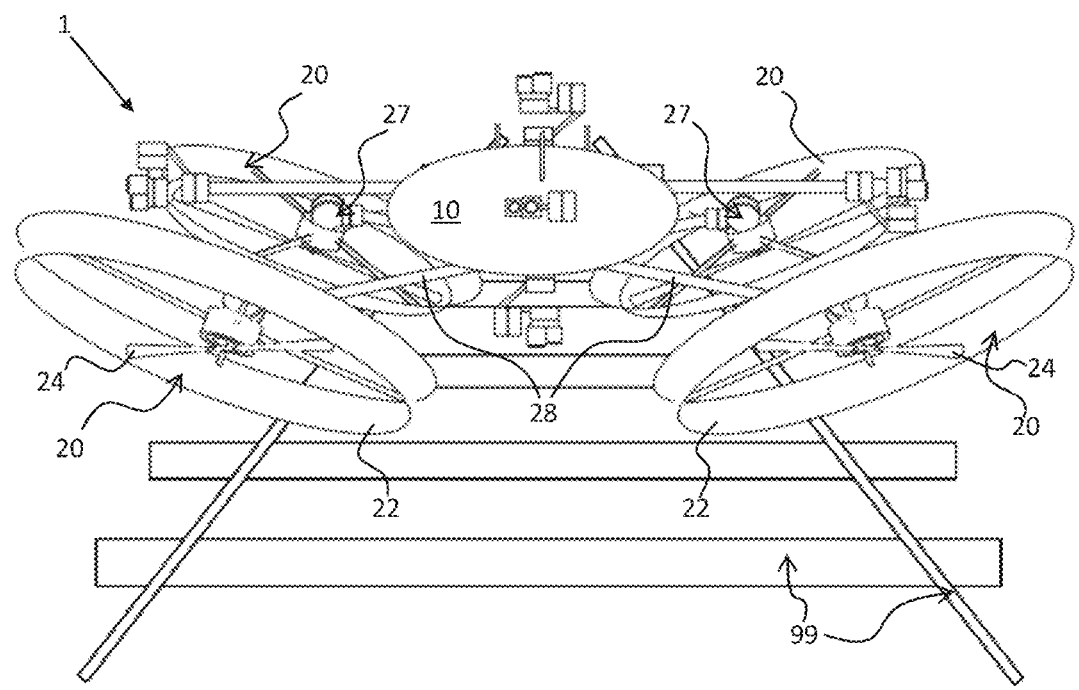
FIG. 7 shows the drone of FIG. 1 during landing on a railway track or during take-off from the railway track.

FIG. 7 shows the drone 1 of FIG. 1 just during landing on a railway track 99 or during take-off from the railway track 99. In this transition from landing to flying or vice versa the actuated joints 27 of the propeller arms 28 are actuated. In order to achieve a pyramid orientation of the propeller assemblies 20 in FIG. 7 that can drive on a railway track 99 a 2-DOF joint 27 is required. This embodiment facilitates landing on the railway track as the orientation shown in this figure is less critical in terms of positioning relative to the railway track 99. All what is required is to have the drone 1 land in this position on the tracks 99, where-after the propeller assemblies 20 may be gradually rotated to a vertical position allowing the propeller guards 22 to slide into the right position on the tracks. When taking off from the track the opposite order of events is chosen. First, the propeller assemblies are rotated from their parallel vertical orientation towards the pyramid form of FIG. 7, while the propellers are started creating a gradually increasing upwardly directed thrust. After that, the thrust may be boosted to enable the drone 1 to fly.

Figure 8:
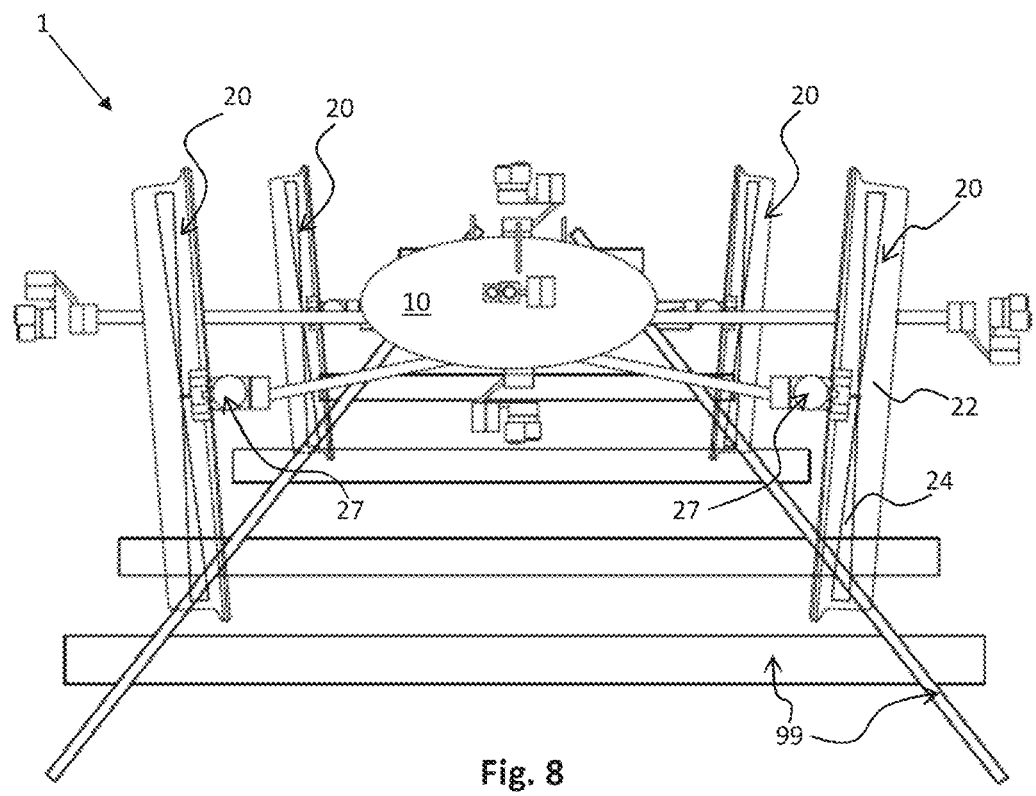
FIG. 8 shows the drone of FIG. 7 in a different stage during landing on the railway track or take-off from the railway track.

To facilitate understanding of the landing or take-off procedure, FIG. 8 shows the drone 1 of FIG. 7 in a different stage during landing on the railway track 99 or take-off from the railway track 99.

Figure 9:
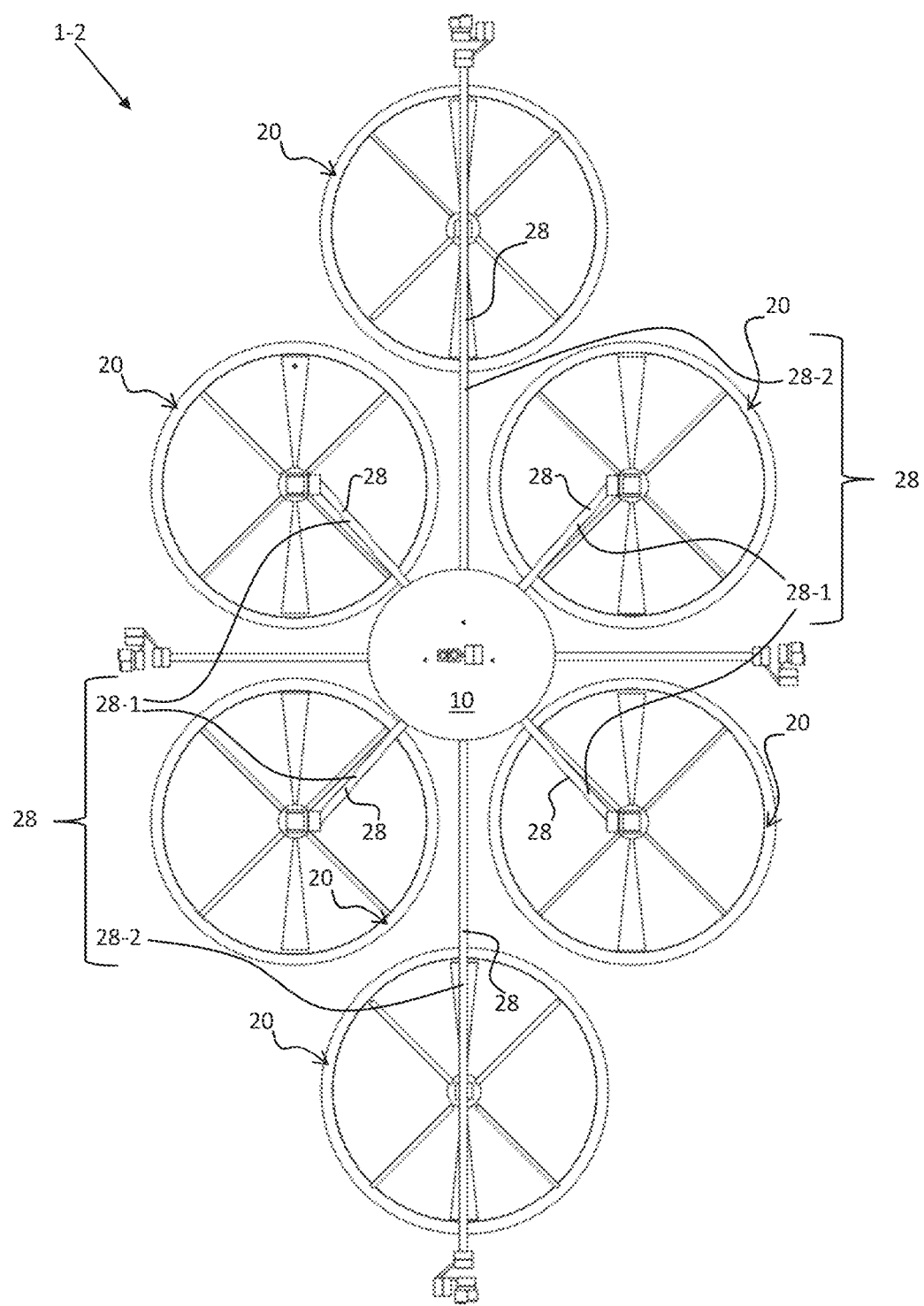
FIG. 9 shows a second embodiment of a drone in accordance with the invention being in flight mode.

FIG. 9 shows a second embodiment of a drone 1-2 in accordance with the invention being in flight mode. The quadcopter embodiment of the drone 1 as illustrated in FIGS. 1-8 func-tions well. However, during landing and take-off it has a reduced upwardly directed thrust due to the tilting of the propeller assemblies 20. The embodiment of FIG. 9 has two more propeller arms 28, i.e., second subset 28-2 of propeller arms 28, wherein the two additional propeller arms 28 do not have an actuated joint as the other subset 28-1 of propeller arms 28 have. These two propeller arms 28 together with their propeller assemblies 28-2 provide for an additional upwardly directed thrust when the first subset 28-1 of propeller arms 28 is being rotated towards vertical orientation (driving mode). This facilitates an easier and faster landing of the drone 1. Of course, it is possible to provide these arms also with actuated joints, but just to keep those joints unchanged during landing or take-off.

Figure 10:
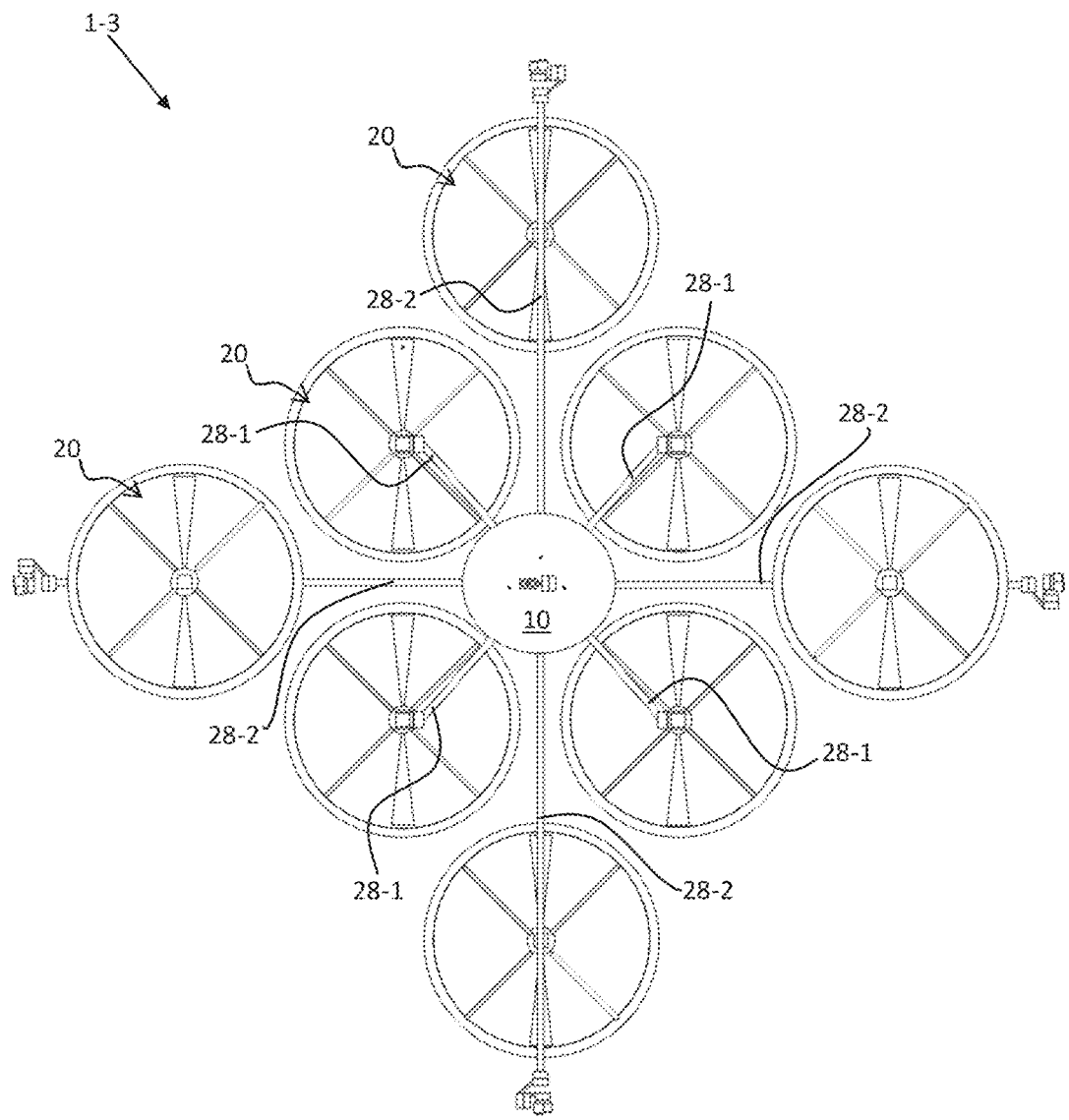
FIG. 10 shows a third embodiment of a drone in accordance with the invention being in flight mode.

FIG. 10 shows a third embodiment of a drone 1-3 in accordance with the invention being in flight mode. In the same line as the embodiment of FIG. 9 the drone 1 may be provided with a subset 28-2 of four additional propeller arms 28 for generating even more upwardly directed thrust when the first subset 28-1 is rotated towards vertical orientation (driving mode). The respective propeller arms 28 do not have an actuated joint. Of course, it is possible to provide these arms also with actuated joints, but just to keep those joints unchanged during landing or take-off.

Figure 11:
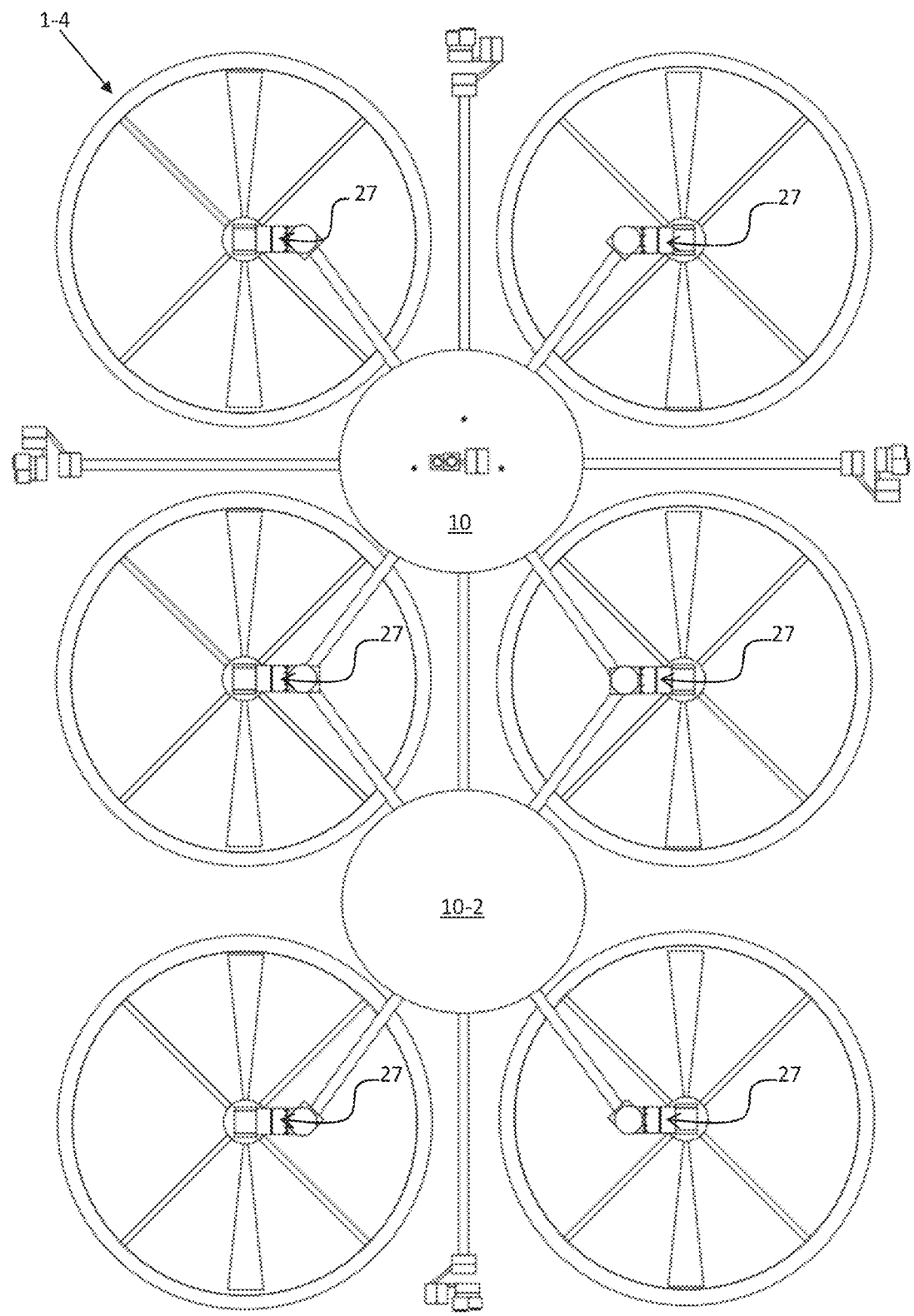
FIG. 11 shows a fourth embodiment of a drone in accordance with the invention being in flight mode.

FIG. 11 shows a fourth embodiment of a drone 1-4 in accordance with the invention being in flight mode. This drone 1-4 is provided with 6 propeller arms, which all have an actuated joint 27 providing three rotation degrees of freedom. The drone 1-4 also comprises a second drone body 10-2 as illustrated, which may comprise further components, such as an extra battery. The three rotation degrees of freedom provide for additional flexibility for the drone both in flight mode as well as in driving mode, where the drone may be adapted to different railway track widths, for example.

Figure 12:
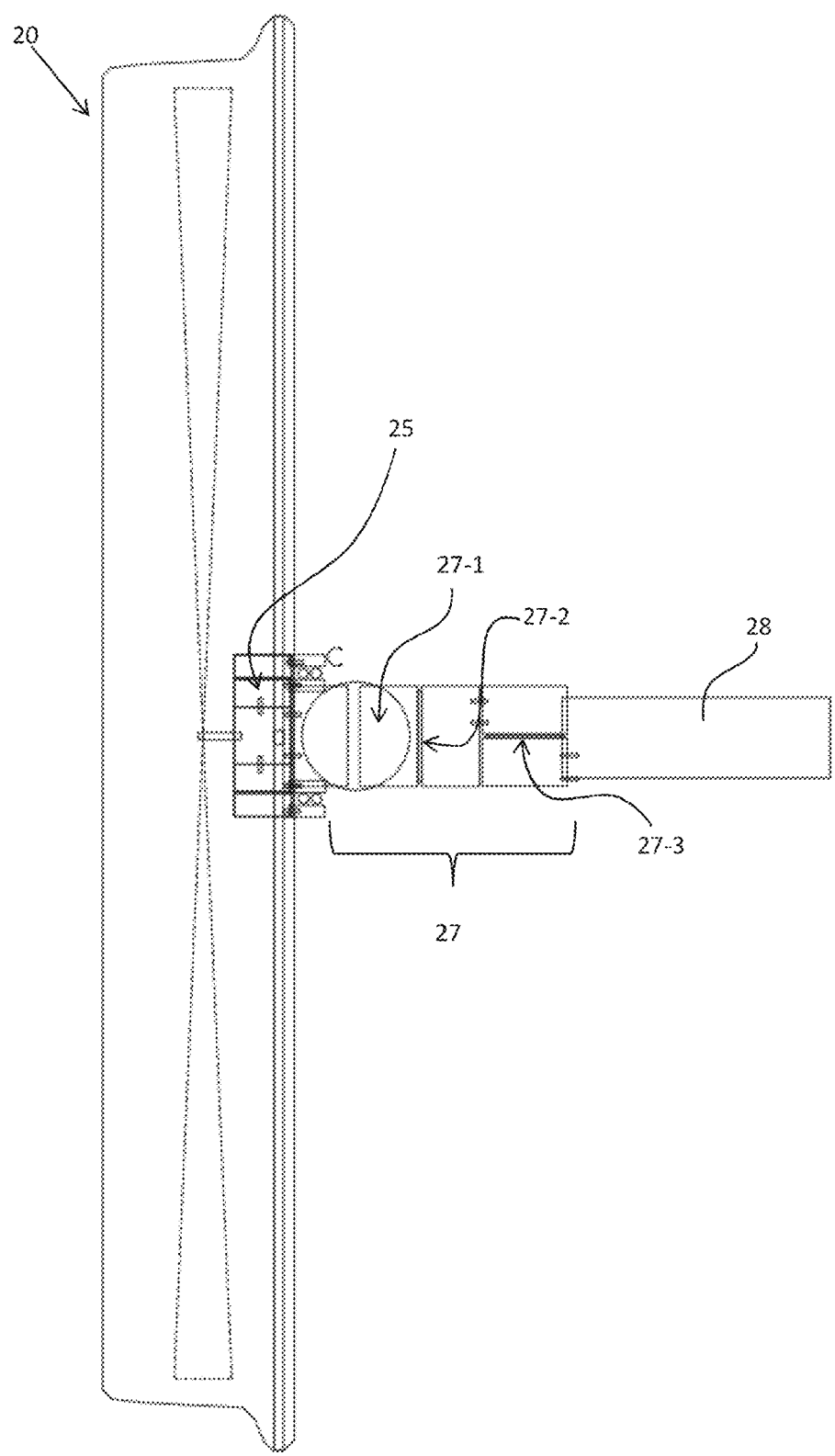
FIG. 12 shows the propeller assembly of FIG. 1 combined with a 3-DOF actuated joint in accordance with a further embodiment of the invention.

FIG. 12 shows the propeller assembly 20 of FIG. 1 combined with a 3-DOF actuated joint 27 in accordance with a further embodiment of the invention. The third rotation degree of freedom is obtained by adding a third subjoint 27-3 as illustrated.

Figure 13:
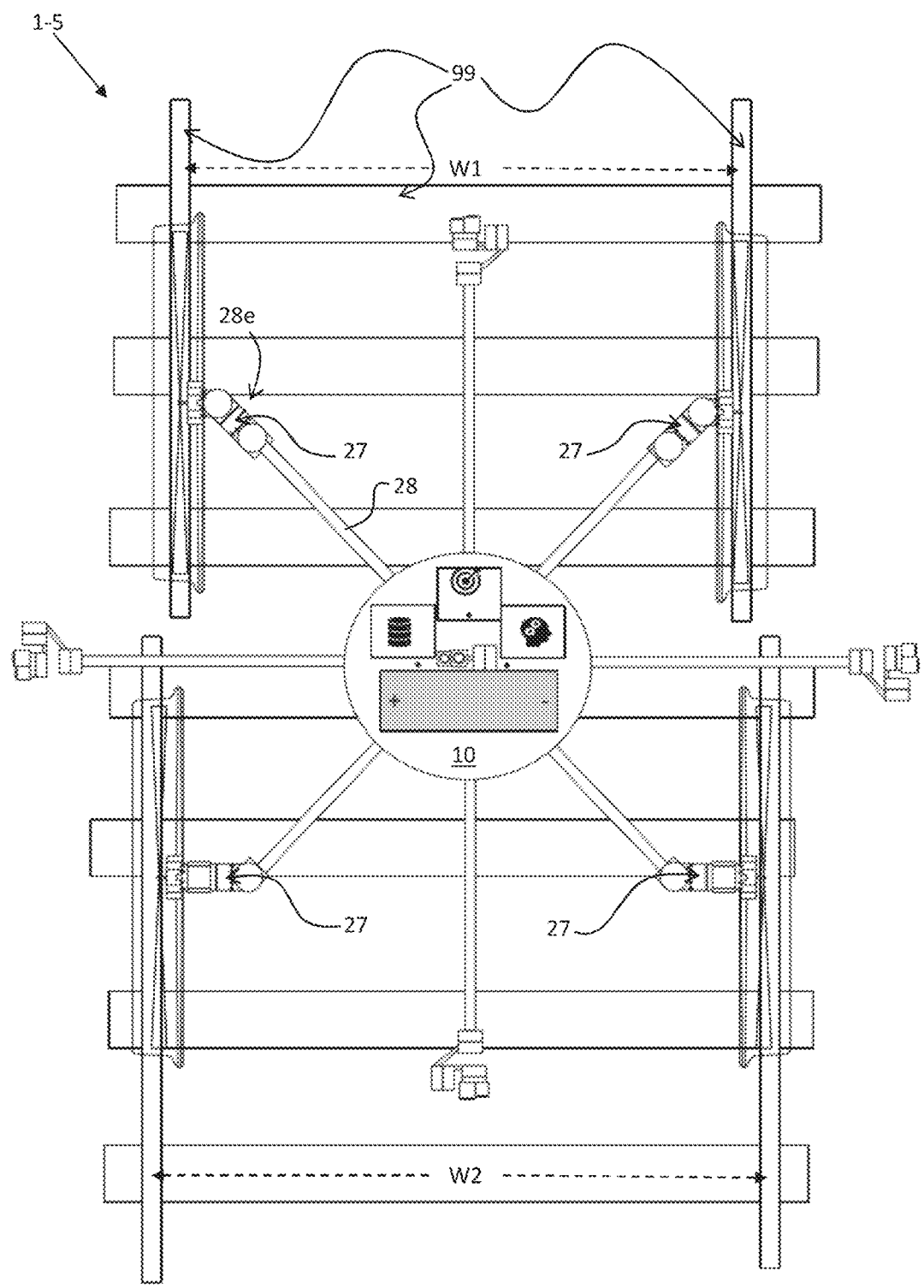
FIG. 13 shows a fifth embodiment of a drone in accordance with the invention being in flight mode.

FIG. 13 shows a fifth embodiment of a drone 1-5 in accordance with the invention being in flight mode. This drone 1 is a quadcopter and has the same actuated joints 27 as in FIG. 12 mounted at respective far ends 28e of the propeller arms 28. The figure serves to illustrate how two extra degrees of freedom allow for adapting the drone dimensions to different widths W1, W2 of the railway track 99.

Figures 14A, 14B:
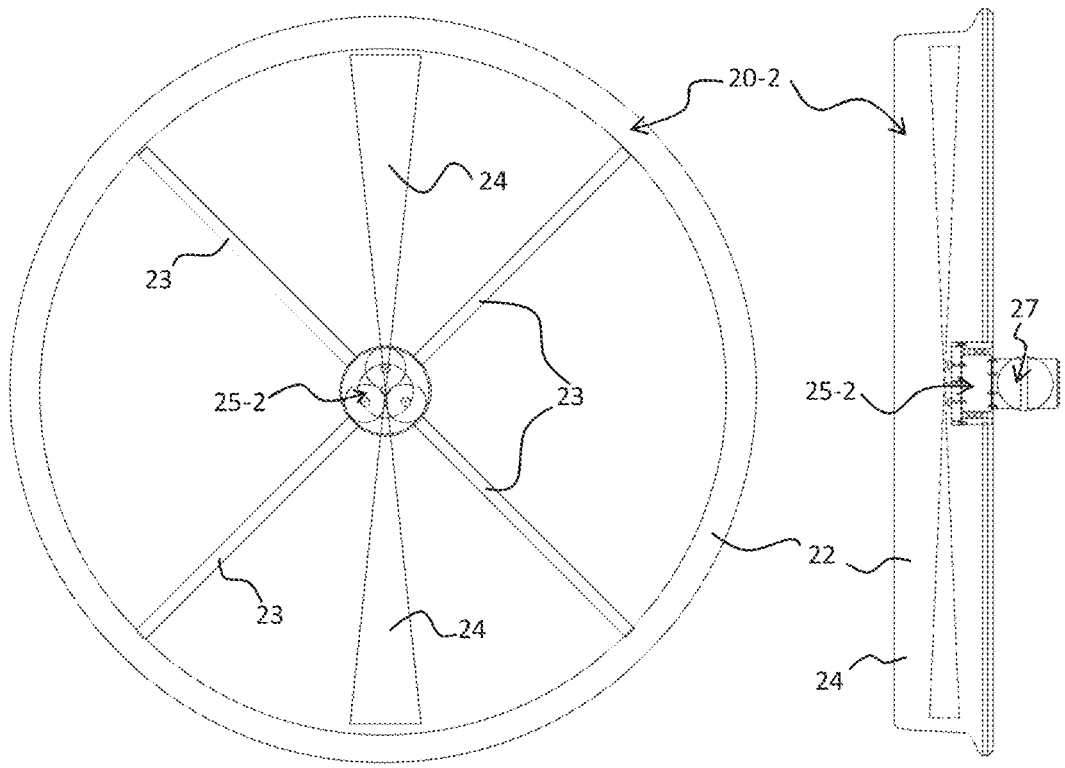
FIG. 14a shows a front view of a propeller assembly in accordance with a further embodiment of the invention.
FIG. 14b shows a side view of the propeller assembly of FIG. 14a, where also part of the actuated joint is visible.
Figure 15A:
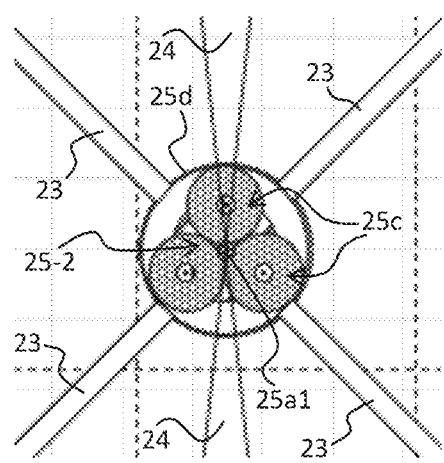
Figure 15B:
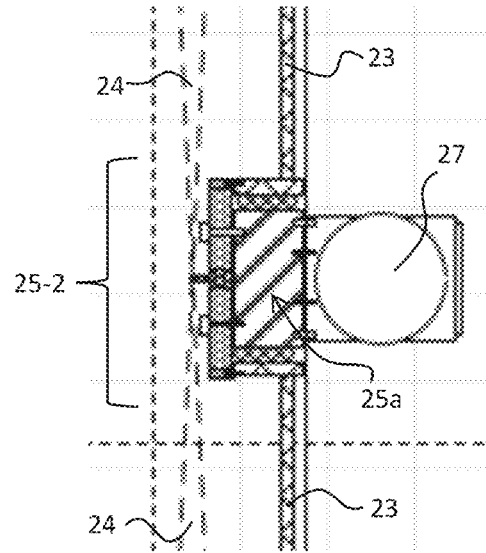
FIG. 15b shows a zoom view of FIG. 14b.

FIG. 14a shows a front view of a propeller assembly 20-2 in accordance with a further embodiment of the invention. FIG. 14b shows a side view of the propeller assembly 20-2 of FIG. 14a, where also part of the actuated joint 27 is visible. FIG. 15a shows a zoom view of FIG. 14a. FIG. 15b shows a zoom view of FIG. 14b. The propeller assembly 20-2 comprises a modified motor assembly 25-2. This propeller assembly 25-2 comprises one motor 25a and a planetary gear 25c mounted on and around the motor 25a. The driving shaft 25a1 of the motor 25a not only drives the propeller 24, but also the sun gear of the planetary gear 25c. The ring gear 25d of the planetary gear is connected with the spokes 23 of the propeller guard 22. An electromechanically operated clutch (not shown) may be provided as well to allow for selecting between rotating the propeller 24 or the propeller guard 22.

The particular embodiments disclosed above are illustrative only, as the invention may be modified and practiced in different but equivalent manners apparent to those skilled in the art having the benefit of the teachings herein. For example, even though the figures all show embodiments having four propeller assemblies or more, the invention explicitly applies to embodiments having three propeller assemblies as well. Drones with three propellers have been disclosed before and the invention equally applies to those drones as well. Depending on the configuration of the drone and the propeller arms, it may be necessary (when switching from flight mode to driving mode) to modify one of the propeller arms in that embodiment so that one of the propeller guards can be translated to land on one of the two railway tracks (while the other propeller assemblies only require rotation when switching from flight mode to driving mode, each propeller guard landing on a different track).

The invention is about a special drone, which has extra functionality, namely that it can drive on the railway. How a drone is controlled and remotely operated or autonomously controlling itself is considered known to the person skilled in the art and is therefore not discussed in this specification. Also, the specification does not give many details about the controlling of the motors and actuators in the drone as that is also is considered to be known knowledge for the person skilled in the art. Drones, motors and actuators and all control to make them do what they are supposed to do are off-the-shelf ingredients.

The person skilled in the art may easily find alternative solutions for the mechanical parts of the drone. The invention covers all these variants as long as they are covered by the claims. No limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the abovementioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. The invention may be implemented by means of hardware comprising several distinct elements, and by means of a suitably programmed computer. In the device claims enumerating several means, several of these means may be embodied by one and the same item of hardware.

The invention claimed is:

1. A drone having railway driving capabilities, the drone comprising:
   a drone body, and
   at least three propeller arms distributed around and connected to the drone body,
      wherein each propeller arm is provided with a propeller assembly comprising a propeller,
         wherein each propeller is driven by a motor assembly,
         wherein the propeller assembly of at least a subset of the at least three propeller arms is provided with a rotatably mounted propeller guard mounted around and being placed coaxially with the propeller,
         wherein the propeller guard is shaped as a train wheel and is driven by the motor assembly,
         wherein the motor assembly comprises a first motor for driving the propeller and a second motor for driving the propeller guard,
         wherein the second motor is positioned concentrically around the first motor, such that an axis of rotation of the first motor and an axis of the second motor are substantially the same,
      wherein each propeller arm of the subset of the at least three propeller arms is provided with an actuated joint for providing the respectively connected propeller assembly with at least one rotation degree of freedom so that the propeller can be rotated between a flight mode and a driving mode and back, wherein the flight mode involves a more horizontal orientation of the propeller assembly for providing an upwardly-directed thrust force to the drone, in operational use, and wherein the driving mode involves a more vertical orientation of the propeller assembly for allowing the respective propeller guard to drive on a railway track.

2. The drone according to claim 1, wherein the actuated joints are placed near ends of the propeller arms.

3. The drone according to claim 2, wherein the subset comprises at least three propeller arms.

4. The drone according to claim 2, wherein the subset comprises at least two propeller arms.

5. The drone according to claim 1, wherein the subset comprises at least two propeller arms.

6. The drone according to claim 1, wherein at least one of the actuated joints is configured for providing at least two rotation degrees of freedom.

7. The drone according to claim 6, further comprising at least one processor that is configured to:
control the actuated joints of the subset of propeller arms to achieve a pyramid orientation of the subset of propeller assemblies;
land the drone on the railway track while the propeller arms are in the pyramid orientation such that each propeller guard of the subset of propeller arms contacts a rail of the railway track; and
control the actuated joints of the subset of propeller arms to transition from the pyramid orientation of the subset of propeller assemblies to the driving mode.

8. The drone according to claim 1, wherein at least one of the actuated joints is configured for providing at least three rotation degrees of freedom.

9. The drone according to claim 1, wherein the drone comprises a total of four propeller arms.

10. The drone according to claim 1, wherein the drone comprises a total of six propeller arms.

11. The drone according to claim 1, wherein the drone comprises a total of eight propeller arms.

12. The drone according to claim 1, wherein the motor assembly comprises a gear and a motor for driving the propeller and the propeller guard, wherein the gear is coupled between a driving shaft of the propeller and a central portion of the propeller guard.

13. The drone according to claim 1, wherein the drone further comprises at least one camera for performing visual inspection.

14. The drone according to claim 1, wherein the drone further comprises railway maintenance equipment, wherein the railway maintenance equipment comprises one or more of: a lubrication system; a manipulator; or a gripper.

15. The drone according to claim 1, wherein the subset comprises at least three propeller arms.

16. The drone according to claim 1, wherein the train wheel shape comprises:
a driving surface that contacts a top surface of a railway rail in the driving mode; and
a protruding rim on one side of the propeller guard that partially extends below the top surface of the railway rail in the driving mode as the propeller guard rotates.

17. The drone according to claim 1, wherein each propeller arm of the subset is configured to provide at least three movement degrees of freedom, including at least two rotation degrees of freedom provided via the actuated joints, and
wherein the drone further comprises at least one processor that is configured to:
adapt a distance between at least two of the propeller guards to match a distance between railway rails of the railway track, such that the drone is capable of adapting to railway tracks of different width.

18. A drone having railway driving capabilities, the drone comprising:
a drone body;
a plurality of propeller arms distributed around and connected to the drone body; and
a plurality of propeller assemblies, each of the plurality of propeller assemblies comprising:
a propeller configured to rotate around an axis of rotation;
a propeller guard shaped as a train wheel and mounted around the propeller, the propeller guard comprising:
an inner surface proximate to the propeller,
wherein the inner surface has a first radius that is greater than a radius of the propeller;
an outer surface distal to the propeller,
wherein at least a portion of the outer surface has a second radius that is greater than the first radius, and
wherein the portion of the outer surface is configured to contact a top surface of a railway rail in a driving mode; and
a protruding rim on one side of the outer surface,
wherein the protruding rim has a third radius that is greater than the second radius, and
wherein a portion of the protruding rim proximate to the railway rail is configured to extend below the top surface the driving mode;
a motor assembly coupled to the propeller and the propeller guard, and configured to rotate the propeller and the propeller guard around the axis of rotation,
wherein the motor assembly comprises a first motor for driving the propeller and a second motor for driving the propeller guard,
wherein the second motor is positioned concentrically around the first motor, such that an axis of rotation of the first motor and an axis of the second motor are substantially the same; and
a plurality of spokes coupled between the propeller guard and the motor assembly; and
a plurality of actuated joints, each of the plurality of actuated joints coupled between a propeller arm of the plurality of propeller arms and a respective propeller assembly of the plurality of propeller assemblies,
wherein each actuated joint of the plurality of actuated joints facilitates rotation of the respective propeller assembly between a flight mode and a driving mode,
wherein the flight mode involves a more horizontal orientation of the propeller assembly for providing an upwardly-directed thrust force to the drone, in operational use, and
wherein the driving mode involves a more vertical orientation of the propeller assembly for allowing the respective propeller guard to drive on a railway track comprising a plurality of railway rails.

19. The drone according to claim 18, wherein each of the plurality of actuated joints is configured for providing at least two rotation degrees of freedom, and
wherein the drone further comprises at least one processor that is configured to:
control each of the actuated joints of the plurality of actuated joints to rotate the corresponding propeller assembly to an intermediate orientation between the more horizontal orientation and the more vertical orientation along each of the at least two rotation degrees of freedom;

land the drone on the railway track while the propeller arms are in the intermediate orientation such that each propeller guard of the plurality of propeller guards contacts the railway track; and control each of the actuated joints of the plurality of actuated joints to rotate the corresponding propeller assembly from the intermediate orientation to the more vertical orientation.

\* \* \* \* \*